Dec. 11, 1928. 1,694,821
J. A. HEANY
AIR SPRING
Original Filed Dec. 31, 1921 3 Sheets-Sheet 1
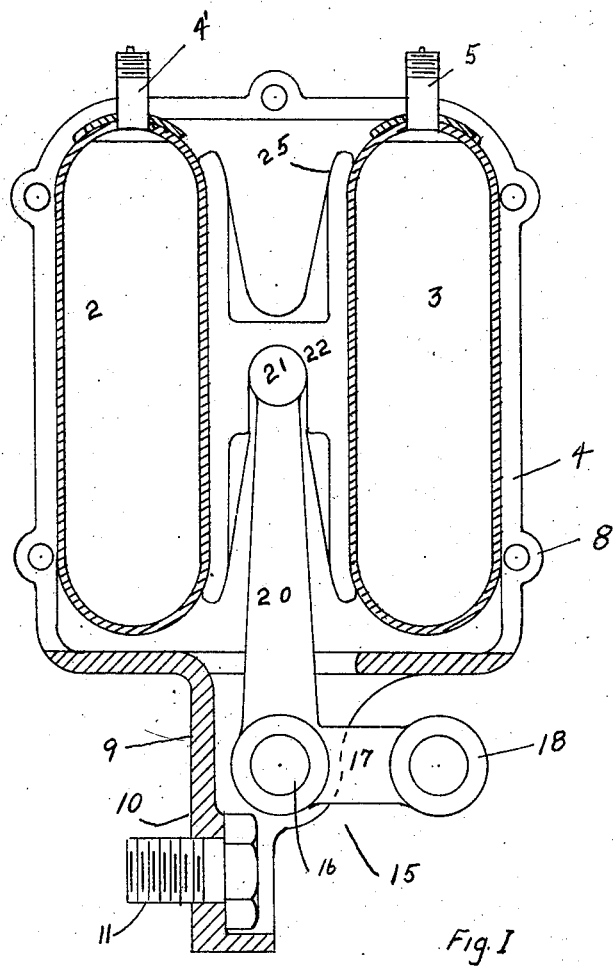
Fig. I
INVENTOR.
JOHN ALLEN HEANY
BY
ATTORNEYS.

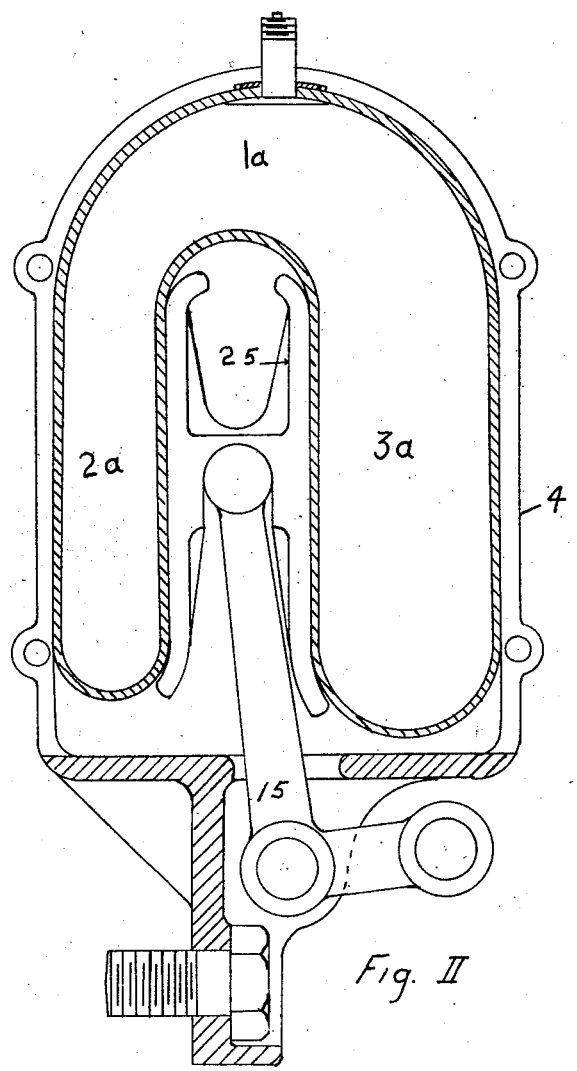
Fig. II

Dec. 11, 1928.
J. A. HEANY
1,694,821
AIR SPRING
Original Filed Dec. 31, 1921   3 Sheets-Sheet 3
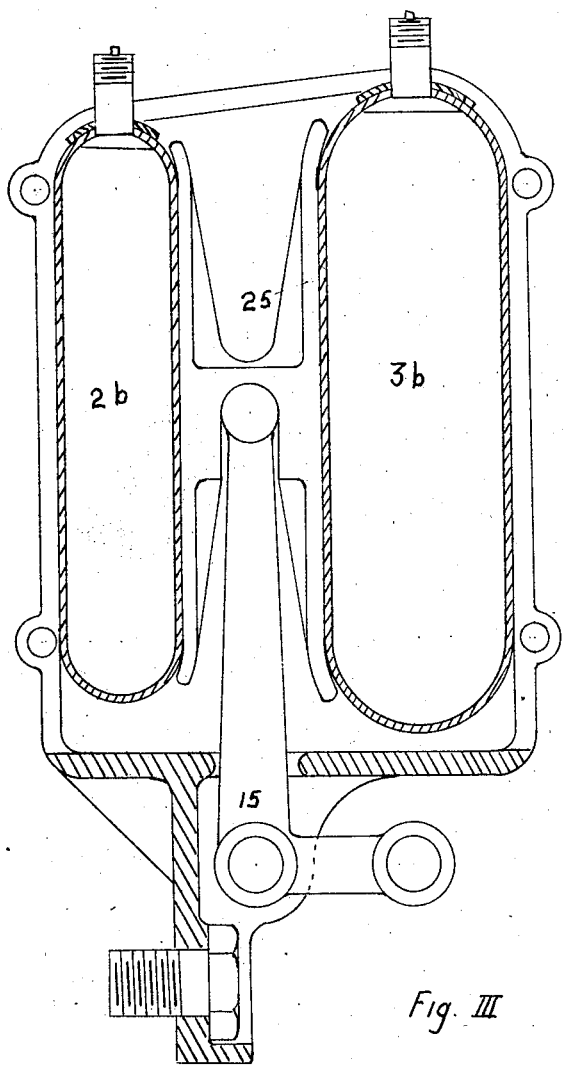
Fig. III
INVENTOR.
JOHN ALLEN HEANY
BY
ATTORNEYS.

Patented Dec. 11, 1928.

1,694,821

UNITED STATES PATENT OFFICE.

JOHN ALLEN HEANY, OF NEW HAVEN, CONNECTICUT, ASSIGNOR TO HEANY LABORATORIES, INC., OF NEW HAVEN, CONNECTICUT, A CORPORATION OF CONNECTICUT.

AIR SPRING.

Application filed December 31, 1921, Serial No. 526,443. Renewed May 23, 1928.

The present invention relates to an air spring or pneumatic shock absorber and more particularly to a shock absorber for use in connection with any spring suspension for a vehicle adapted to take up shock transmitted through the wheels and axles of the vehicle. It is a modified form of the invention described and illustrated in my co-pending application entitled "Air spring shock absorber", Serial No. 487,491, filed July 25th, 1921.

Shock absorbers are commonly applied or inserted between the axle or axle housing of a vehicle and the spring supporting mechanism. In the ordinary type of shock absorbers difficulty has been encountered with in receiving and deadening both the direct and rebound shocks received from the axle or axle housing by a simplified and practical apparatus.

An object of the present invention is therefore to provide a shock absorber of simple construction in which both the rebound and direct shock may be absorbed by a practical operative successful mechanism. Thus, the invention may be particularly useful as a device adapted for use on automobiles for absorbing the small shock and vibration as caused by the irregularities of the road, but it is likewise equally adapted for use in absorbing the ordinary shock of longer periodicity transmitted from the ground through to the automobiles chassis.

Another object of the invention is to provide a shock absorber in which compressed air or gas or fluid confined in a pneumatic cushion such as a rubber tube or other type of container may be utilized for absorbing the shock and rebound. It is a particular object of the present invention to provide in a device of the characteristics suggested herein two separate pneumatic containers, one to receive and absorb the direct shock, and the other to absorb the rebound. It is a further particular object of the present invention to provide a simplified practical apparatus of the character indicated in which the resistance or absorption of the shock is greater when absorbing one type of shock, either direct or rebound shock, than when absorbing the other. In certain uses to which the present invention may be put, the resistance offered by the shock absorbing device may be arranged to be less on the side taking the rebound than on that taking the direct shock; this is because when running, the force of a direct shock such as is the case by the wheels of vehicle striking a raised spot in the road, is added to the weight of the car. When the wheel drops away from the car as in the case of dropping into a depression or leaving a raised spot in the road, the shock of rebound is subtracted from the dead weight of the car. However, in other uses of the invention it may be desirable in giving greater resistance to the spring suspension of the vehicle as a whole to make the resistance or shock absorbing capabilities of the device much greater on the rebound than in taking the direct shock so that the periodicity is shortened and the recoil checked and thus the vehicle is evenly and gradually brought back to normal position.

A further object of the invention is to provide a shock absorber which may be easily installed in the ordinary type of spring suspension and in which the elasticity of the shock absorbing element may be readily adjusted to various load conditions.

Various other objects within the scope of this invention relate to the arrangement of the related elements or the structures and to various details of construction and to economies of manufacture and numerous other features as will be apparent from a consideration of the drawing and related description of one form of the invention which may be the preferred, there being illustrated in Fig. 1 a sectional view, showing a shock absorber having two separate air chambers concluding an embodiment of my present invention.

Fig. 2 is a similar view, showing different sizes of the air chambers offering different resistances upon the direct or rebound shock and illustrating an application of the invention wherein merely one pneumatic container is employed.

Fig. 3 illustrates an apparatus having two separate pneumatic cushions, each being a different size.

Referring to Fig. 1, 2 and 3 represent pneumatic tubes, each of which may be cylindrically shaped with curved ends if desired and made of live rubber or suitable fabric or other material capable of being inflated with air or any other gas or fluid to any required pressure and to this end I have shown each of the tubes 2 and 3 as provided with small tire valves 4' and 5, through which the tubes 2 and 3 may be inflated to any desired degree of pressure.

The tubes 2 and 3 are supported in a suitable casing 4 illustrated herein as being made in two halves, these being provided with eyes 8 through which bolts may be inserted to hold the two halves of the casing 4 together. Casing 4 is rigidly connected to or provided with bracket 9 by the means of which the casing may be secured to the axle or axle housing at 10 by means of a bolt 11. It is apparent that any other type of means of securing the device in the proper position in the spring suspension of a vehicle may be provided.

A bell crank lever 15 pivoted at 16 in suitable bearings in the bracket extension 9, has one arm 17 provided at 18 with means to secure the same to the spring shackle of a vehicle spring suspension for example and the other arm 20 terminates in a ball or roller shaped end 21 which fits in a suitable groove or bearing 22 of a pressure cross head piece 25. The opposite faces of the cross head pressure piece 25 bear against the pneumatic tubes 2 and 3 as will be apparent from the inspection of Fig. 1. It will be noted that the terminal 21 of the arm 20 may both rotate in the bearing 22 and slide longitudinally therein, this arrangement being made to suitably accommodate the proper positioning of the various parts of the device in actual and continued operation regardless of the great angular variety of movements to which the arm 20 of the bell crank lever 15 may be subjected with respect to the angle or location or position of the tubes 2 and 3 as determined by the casing 4, all dependent upon relative movements of the members to which the shock absorbing device is applied.

The ratio of the length of the two arms 17 and 20 of the bell crank lever 15 determines the proportion of the total load to be carried by the tube and when properly designed, the pressure per square inch may be made comparatively low so that the effect is that of riding with a soft tire.

The operation of the construction illustrated will be readily understood and it will be apparent that as the arm 17, through the connection 18 to a spring of the vehicle, moves in one direction or the other relative to the axle housing or to casing 10 which is secured thereto, the pressure cross head 25 will bear against either the pneumatic cushion 2 or 3 as the case may be. The amount of pressure in each of the tubes 2 and 3 may be the same, or as heretofore stated, different effects on the resistance to direct shock may be obtained from that taking place upon recoil or rebound. Thus, the pressure per square inch in the tube 2 may be greater or less as desired than the pressure within the tube 3. This will make the reaction of the respective tubes different as will be at once apparent.

Referring to Fig. 2 it will be seen that instead of employing the two separate pneumatic containers 2 and 3 illustrated in Fig. 1, there is provided a single U-shaped pneumatic cushion 1ª having one leg 2ª of different size than the other leg 3ª. The casing 4 is provided as in the other embodiment of the invention with the bell crank lever 15 which operates the pressure cross head 25 as illustrated in connection with Fig. 1. With a single U-shaped tube as shown in Fig. 2 both sides of the tube are inflated with the same pressure per square inch but the side 2ª having a smaller diameter offers less surface and thereby less total pressure to that side of the pressure cross head 25. Otherwise the operation of the disclosure contained in Fig. 2 is the same as that of Fig. 1 and will be readily understood from the foregoing.

In Fig. 3 I have illustrated a device similar to that of Fig. 1 but in which the two chambers 2ᵇ and 3ᵇ are made of different sizes and the same pressure per square inch is in each. The bell crank 15 and cross head 25 cooperate therewith as in the other embodiments.

It is apparent that within the spirit of the invention various modifications and different arrangements may be made other than as disclosed herein and the present disclosure illustrating bearings comprehends all possible variations thereof many of which will be apparent to those skilled in the art.

Having thus described the invention what is claimed as new and what is desired to secure by Letters Patent is:

1. A shock absorber device consisting of an enclosing case and a lever arm adapted to be connected to two relatively movable parts of an automobile and a resilient member interposed between said case and arm; said resilient member being a U-shaped pneumatic tube with means for inflation and constructed with one side larger in diameter than the other.

2. A shock absorbing device consisting of an enclosing case; a lever arm adapted to be connected to two relatively movable parts of the supporting mechanism; and a resilient member interposed between said case and said arm, said resilient member being approximately formed of a U-shaped tube having arms of different cross section; and a pressure plate interposed between the arms of said tube and connected to said lever whereby resistance of different values is offered to said pressure plate in accordance with its direction of movement.

3. A shock absorbing device comprising an enclosing casing; a lever arm adapted to be connected to two relatively movable parts of a supporting mechanism; and a resilient member interposed between said casing and said arm, said resilient member being U-shaped and having one arm of larger cross section than the other.

4. A shock absorbing device comprising an enclosing casing; a lever arm positioned and movable within said casing; a pressure plate pivotally attached to the end of said arm; and means interposed between said pressure plate and either side of the casing wall adapted to resist differently, the direct linear movement of the pressure plate.

5. A connection and support between the parts of a vehicle one of which parts is to be connected to and supported by the other part, comprising interconnected inflatable cushion members carried with one part and closely engaging opposite sides of the other part, one of said members being larger than the other member.

6. In a shock absorber for vehicle spring suspensions, a casing, a resilient U-shaped gas bag supported in said casing, means to compress all of the gas in said bag upon relative movement in either direction between a vehicle and the running gear therefor, said bag being adapted to offer greater resistance to said means in one direction than in the other.

In testimony whereof, I affix my signature.

JOHN ALLEN HEANY.